(12) United States Patent
Noguchi et al.

(10) Patent No.: US 12,138,615 B2
(45) Date of Patent: *Nov. 12, 2024

(54) POLYMER, OXYGEN ABSORBER USING SAME, AND CURABLE COMPOSITION

(71) Applicant: KURARAY CO., LTD., Okayama (JP)

(72) Inventors: Daiki Noguchi, Tainai (JP); Takashi Fukumoto, Tainai (JP); Yuki Nishijima, Tainai (JP)

(73) Assignee: KURARAY CO., LTD., Okayama (JP)

( * ) Notice: Subject to any disclaimer, the term of this patent is extended or adjusted under 35 U.S.C. 154(b) by 504 days.

This patent is subject to a terminal disclaimer.

(21) Appl. No.: 17/601,998

(22) PCT Filed: Feb. 20, 2020

(86) PCT No.: PCT/JP2020/006926
§ 371 (c)(1),
(2) Date: Oct. 7, 2021

(87) PCT Pub. No.: WO2020/208951
PCT Pub. Date: Oct. 15, 2020

(65) Prior Publication Data
US 2022/0152582 A1    May 19, 2022

(30) Foreign Application Priority Data
Apr. 11, 2019   (JP) .................... 2019-075745

(51) Int. Cl.
| B01J 20/26 | (2006.01) |
| B01D 53/02 | (2006.01) |
| B01D 53/14 | (2006.01) |
| B01J 20/22 | (2006.01) |
| B01J 20/30 | (2006.01) |
| C08G 59/20 | (2006.01) |
| C08G 59/62 | (2006.01) |
| C08G 65/00 | (2006.01) |

(Continued)

(52) U.S. Cl.
CPC ........ B01J 20/262 (2013.01); B01D 53/1493 (2013.01); B01J 20/3085 (2013.01); C08G 59/20 (2013.01); C08G 59/62 (2013.01); *B01D 2252/205* (2013.01)

(58) Field of Classification Search
None
See application file for complete search history.

(56) References Cited

U.S. PATENT DOCUMENTS

| 3,644,568 A | 2/1972 | Tilley et al. |
| 4,722,978 A | 2/1988 | Yu |
| 2019/0270864 A1 | 9/2019 | Noguchi et al. |

FOREIGN PATENT DOCUMENTS

| CN | 105271900 A | 1/2016 |
| JP | S61-101518 A | 5/1986 |
| JP | S63-130610 A | 6/1988 |
| JP | H5-78459 A | 3/1993 |
| JP | 2004-277660 A | 10/2004 |
| JP | 2008-308420 A | 12/2008 |
| WO | WO 2018/088206 A1 | 5/2018 |
| WO | WO 2019/107252 A1 | 6/2019 |
| WO | WO 2019/208259 A1 | 10/2019 |

OTHER PUBLICATIONS

Morrison et al., "Tailoring Polyethers for Post-polymerization Functionalization by Cross Metathesis," Organic Letters, vol. 20, pp. 2253-2256 (2018) (Year: 2018).*

(Continued)

*Primary Examiner* — Randy P Gulakowski
*Assistant Examiner* — Ha S Nguyen
(74) *Attorney, Agent, or Firm* — GREENBLUM & BERNSTEIN, P.L.C.

(57) ABSTRACT

A polymer represented by the following general formula (I):

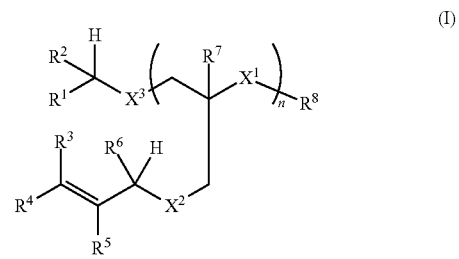

wherein $X^1$, $X^2$, and $X^3$ each represent a chalcogen atom, $R^1$ and $R^2$ each independently represent any one selected from the group consisting of a hydrogen atom, an alkyl group having 1 to 18 carbon atoms, an alkenyl group having 2 to 18 carbon atoms, and an aralkyl group, $R^3$ and $R^4$ each independently represent any one selected from the group consisting of an alkyl group having 1 to 6 carbon atoms, an alkenyl group having 2 to 6 carbon atoms, an aryl group, and an aralkyl group, $R^5$ and $R^6$ each independently represent any one selected from the group consisting of a hydrogen atom, an alkyl group having 1 to 6 carbon atoms, an alkenyl group having 2 to 6 carbon atoms, an aryl group, and an aralkyl group, $R^7$ represents a hydrogen atom or a methyl group, $R^8$ represents any one selected from the group consisting of a hydrogen atom, an alkyl group having 1 to 6 carbon atoms, an alkenyl group having 2 to 6 carbon atoms, an aryl group, and an aralkyl group, n is any integer, and none of $R^3$, $R^4$, $R^5$, and $R^6$ are bonded to each other to form a ring structure.

16 Claims, No Drawings

(51) Int. Cl.
  *C08G 65/24* (2006.01)
  *C08G 65/26* (2006.01)

(56) References Cited

OTHER PUBLICATIONS

ISR for PCT/JP2020/006926, dated Apr. 21, 2020.
Written Opinion for PCT/JP2020/006926, dated Apr. 21, 2020.
Extended European Search Report issued in EP Patent Application No. 20786697.1, dated Dec. 7, 2022.

* cited by examiner

POLYMER, OXYGEN ABSORBER USING SAME, AND CURABLE COMPOSITION

TECHNICAL FIELD

The present invention relates to a specific polymer, an oxygen absorbent containing the same, and a curable composition.

BACKGROUND ART

A radical polymerizable monomer and a radical polymerizable resin used in a coating material, an adhesive, a coating agent, and the like have an unsaturated bond, and are cured by a vinyl crosslinking agent. When the radical polymerizable monomer and radical polymerizable resin are used for a coating material, an adhesive, a coating agent, or the like, curing is usually carried out in an air atmosphere, and therefore, there are problems in that the curing is easily inhibited by oxygen in the air and the curing is delayed, and in that the surface becomes sticky. As means for preventing these problems, addition of a formulation other than a radical polymerizable resin and use of a polymerization mode different from radical polymerization are proposed. PTLs 1 and 2 propose a technique of adding an oxygen absorbent as such a formulation to a radical polymerizable resin. As the oxygen absorbent which is a formulation, PTLs 3 and 4 describe allyl glycidyl ether and the like. In addition, PTL 5 describes a technique of curing a radical polymerizable resin by cation polymerization using a photoacid generator. PTL 6 describes a technique of adding a thiol compound to an olefin. However, in the method using addition of a conventional formulation, a sufficient prevention effect of curing inhibition is not obtained. In addition, when cation polymerization is used as a polymerization mode, there is a problem in that the rate of polymerization reaction is decreased by moisture in the air. When a thiol compound is used as in PTL 6, there is a problem in that a distinctive odor occurs.

CITATION LIST

Patent Literature

PTL 1: JP 63-130610 A
PTL 2: JP 5-78459 A
PTL 3: JP 61-101518 A
PTL 4: U.S. Pat. No. 3,644,568
PTL 5: JP 2008-308420 A
PTL 6: JP 2004-277660 A

SUMMARY OF INVENTION

Technical Problem

As mentioned above, the problem of curing inhibition by oxygen remains to be solved for a radical polymerizable monomer and radical polymerizable resin.

Further, in a coating application, styrene or the like has been frequently used as a reactive diluent, but from the viewpoint of environmental protection, the trend of conversion into a hardly volatile (meth)acrylic acid ester is increasing. However, when a (meth)acrylic acid ester is used, there is a problem in that curing inhibition by oxygen is more likely to occur than in the case of using a conventional reactive diluent.

Thus, a method is desired for suppressing curing inhibition in curing under an environment subject to curing inhibition by oxygen, such as in the air.

The present invention has been made in view of the above conventional problems, and has an object to provide a polymer that can sufficiently promote a curing reaction and that suppresses curing inhibition by oxygen when used in a coating material, an adhesive, a coating agent, or the like. The present invention also has an object to provide an oxygen absorbent containing the polymer, and a curable composition containing the oxygen absorbent.

Solution to Problem

As a result of intensive studies, the present inventors have found that a polymer represented by the following general formula (I) or the general formula (II) can more stabilize generated radicals than conventional oxygen absorbents and exhibits higher oxygen radical scavenging performance, i.e., higher oxygen absorption performance, and have made further studies based on this finding to complete the present invention.

Specifically, the present invention provides [1] to [14] below.

[1] A polymer represented by the following general formula (I):

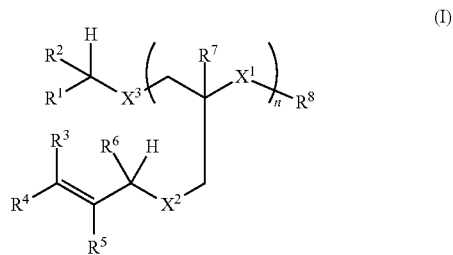

wherein $X^1$, $X^2$, and $X^3$ each represent a chalcogen atom, $R^1$ and $R^2$ each independently represent any one selected from the group consisting of a hydrogen atom, an alkyl group having 1 to 18 carbon atoms, an alkenyl group having 2 to 18 carbon atoms, and an aralkyl group, $R^3$ and $R^4$ each independently represent any one selected from the group consisting of an alkyl group having 1 to 6 carbon atoms, an alkenyl group having 2 to 6 carbon atoms, an aryl group, and an aralkyl group, $R^5$ and $R^6$ each independently represent any one selected from the group consisting of a hydrogen atom, an alkyl group having 1 to 6 carbon atoms, an alkenyl group having 2 to 6 carbon atoms, an aryl group, and an aralkyl group, $R^7$ represents a hydrogen atom or a methyl group, $R^8$ represent any one selected from the group consisting of a hydrogen atom, an alkyl group having 1 to 6 carbon atoms, an alkenyl group having 2 to 6 carbon atoms, an aryl group, and an aralkyl group, n is any integer, and none of $R^3$, $R^4$, $R^5$, and $R^6$ are bonded to each other to form a ring structure.

[2] The polymer according to [1], wherein $X^1$ and $X^2$ in the general formula (I) are each an oxygen atom.

[3] The polymer according to [1] or [2], wherein $R^3$ and $R^4$ in the general formula (I) are each an alkyl group having 1 to 6 carbon atoms.

[4] The polymer according to any one of [1] to [3], wherein $R^5$, $R^6$, and $R^7$ in the general formula (I) are each a hydrogen atom.

[5] The polymer according to any one of [1] to [4], wherein $R^8$ in the general formula (I) is a hydrogen atom.

[6] A polymer represented by the following general formula (II):

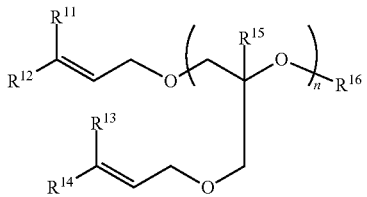

(II)

wherein $R^{11}$, $R^{12}$, $R^{13}$, and $R^{14}$ each independently represent any one selected from the group consisting of an alkyl group having 1 to 6 carbon atoms, an alkenyl group having 2 to 6 carbon atoms, an aryl group, and an aralkyl group, $R^{15}$ represents a hydrogen atom or a methyl group, $R^{16}$ represents any one selected from the group consisting of a hydrogen atom, an alkyl group having 1 to 6 carbon atoms, an alkenyl group having 2 to 6 carbon atoms, an aryl group, and an aralkyl group, and n is any integer.

[7] The polymer according to [6], wherein $R^{16}$ in the general formula (II) is a hydrogen atom.

[8] The polymer according to any one of [1] to [7], wherein the polymer has a weight average molecular weight (Mw) of 300 to 50,000 and a molecular weight distribution (Mw/Mn) of 1.05 to 10.0, based on polystyrene standards.

[9] An oxygen absorbent containing the polymer according to any one of [1] to [8].

[10] The oxygen absorbent according to [9], wherein the oxygen absorbent contains a transition metal salt in an amount of 0.001 to 10% by mole relative to vinyl group in the polymer.

[11] A curable composition containing the oxygen absorbent according to [9] or [10] and a polymerizable monomer and/or a polymerizable resin.

[12] The curable composition according to [11], wherein the polymerizable monomer and/or the polymerizable resin is a radical polymerizable monomer and/or a radical polymerizable resin.

[13] A method of producing a polymer composition containing the following general formula (V) obtained by reacting a compound represented by the following general formula (III), a compound represented by the following general formula (IV), and a base:

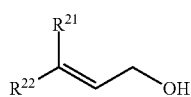

(III)

wherein an each independently represent any one selected from the group consisting of an alkyl group having 1 to 6 carbon atoms, and alkenyl group having 2 to 6 carbon atoms, an aryl group, and an aralkyl group,

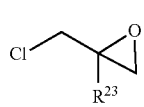

(IV)

wherein $R^{23}$ represents a hydrogen atom or a methyl group,

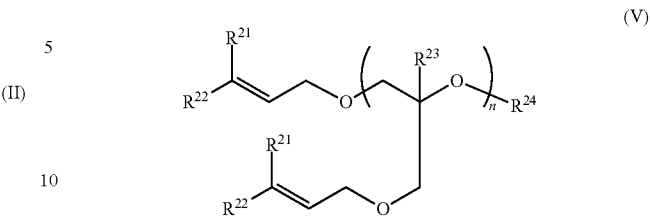

(V)

wherein $R^{21}$, $R^{22}$, and $R^{23}$ have the same meanings as above, $R^{24}$ represents a hydrogen atom or any one selected from the group consisting of an alkyl group having 1 to 6 carbon atoms, an alkenyl group having 2 to 6 carbon atoms, an aryl group, and an aralkyl group, and n is any integer.

[14] The method of producing a polymer composition containing the general formula (V) according to [13], wherein the compound represented by the general formula (III) and the compound represented by the general formula (IV) are used at a ratio (compound (III)/compound (IVIV)) of 1/2 to 2/1.

Advantageous Effects of Invention

According to the present invention, it is possible to provide a polymer having an oxygen absorption performance, which can sufficiently promote a curing reaction and can suppress curing inhibition by oxygen even under a low temperature environment like in a room temperature when used in a coating material, an adhesive, a coating agent, or the like. In addition, an oxygen absorbent containing the polymer and a curable composition containing the oxygen absorbent can be provided.

DESCRIPTION OF EMBODIMENTS

When the polymer represented by the general formula (I) or the general formula (II) of the present invention coexists with a polymerizable monomer, such as a curable (meth) acrylic acid ester, or a polymerizable resin, such as an unsaturated polyester resin, curing inhibition by oxygen is suppressed, resulting in providing an excellent cured product. The mechanism of the action has not been elucidated yet, but is inferred as follows. That is, in the polymerization reaction, a hydrogen atom bonded to carbon constituting a double bond in the polymer represented by the general formula (I) or the general formula (II) of the present invention, which is activated by heat or an active energy ray preferentially reacts with oxygen which inhibits the polymerization reaction or with a peroxy radical produced from oxygen through the polymerization reaction, and thus oxygen or the peroxy radical is consumed. Further, according to the production method of the present invention, the polymer represented by the general formula (I) or the general formula (II) can be produced by a simple method from available raw materials and the resulting polymer composition can be used without any purification. Thus, the cost in the process can be reduced to make the product inexpensive, which is suitable for coating material applications and the like requiring inexpensiveness.

Moreover, since the polymer represented by the general formula (I) or the general formula (II) of the present invention is a high molecular compound, the polymer tends to remain in a cured product and tends not to be eluted.

[Polymer Represented by the General Formula (I)]

The polymer of the present invention is a polymer represented by the following general formula (I).

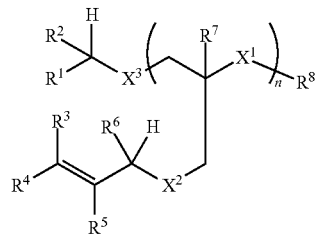

In the general formula (I), $X^1$, $X^2$, and $X^3$ each independently represent a chalcogen atom. $X^1$, $X^2$, and $X^3$ are each preferably an oxygen atom or a sulfur atom and more preferably an oxygen atom, from the viewpoint of ease of production of the polymer and from the viewpoint of improvement in oxygen absorption performance.

$R^1$ and $R^2$ in the general formula (I) each independently represent any one selected from the group consisting of a hydrogen atom, an alkyl group having 1 to 18 carbon atoms, an alkenyl group having 2 to 18 carbon atoms, and an aralkyl group.

Examples of the alkyl group having 1 to 18 carbon atoms include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, an n-heptyl group, an isoheptyl group, an n-octyl group, an isooctyl group, an n-nonyl group, an isononyl group, an n-decanyl group, an isodecanyl group, an n-undecanyl group, an n-dodecanyl group, an n-tetradecanyl group, an n-hexadecanyl group, an n-octadecanyl group, a cyclopropyl group, a cyclobutyl group, a cyclopentyl group, and a cyclohexyl group, a norbornyl group, an isobornyl group, and an adamantly group.

Examples of the alkenyl group having 2 to 18 carbon atoms include a vinyl group, an allyl group, a propenyl group, an isopropenyl group, a butenyl group, an isobutenyl group, a pentenyl group, a hexenyl group, a heptenyl group, an octenyl group, a nonenyl group, a decanenyl group, an undecanenyl group, a dodecanenyl group, a tetradecanenyl group, an octadecanenyl group, an iso-3-hexenyl group, a cyclohexenyl group, a norbornenyl group, and an isobornenyl group.

Examples of the aralkyl group include a benzyl group, a 2-phenylethyl group, a 2-naphthylethyl group, and a diphenylmethyl group.

Among them, $R^1$ and $R^2$ are each preferably a hydrogen atom.

$R^3$ and $R^4$ in the general formula (I) each independently represent any one of an alkyl group having 1 to 6 carbon atoms, an alkenyl group having 2 to 6 carbon atoms, an aryl group, and an aralkyl group.

Examples of the alkyl group having 1 to 6 carbon atoms include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, a cyclopropyl group, a cyclobutyl group, a cyclopentyl group, and a cyclohexyl group.

Examples of the alkenyl group having 2 to 6 carbon atoms include a vinyl group, an allyl group, a propenyl group, an isopropenyl group, a butenyl group, an isobutenyl group, a pentenyl group, a heptenyl group, a hexenyl group, an iso-3-hexenyl group, and a cyclohexenyl group.

Examples of the aryl group include a phenyl group, a tolyl group, a xylyl group, and a naphthyl group.

Examples of the aralkyl group include a benzyl group, a 2-phenylethyl group, a 2-naphthylethyl group, and a diphenylmethyl group.

Among them, $R^3$ and $R^4$ are preferably each independently either an alkyl group having 1 to 6 carbon atoms or an alkenyl group having 2 to 6 carbon atoms, more preferably an alkyl group having 1 to 4 carbon atoms, and still more preferably a methyl group.

$R^5$ and $R^6$ in the general formula (I) each independently represent any one of a hydrogen atom, an alkyl group having 1 to 6 carbon atoms, an alkenyl group having 2 to 6 carbon atoms, an aryl group, and an aralkyl group.

Examples of the alkyl group having 1 to 6 carbon atoms include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, a cyclopropyl group, a cyclobutyl group, a cyclopentyl group, and a cyclohexyl group.

Examples of the alkenyl group having 2 to 6 carbon atoms include a vinyl group, an allyl group, a propenyl group, an isopropenyl group, a butenyl group, an isobutenyl group, a pentenyl group, a heptenyl group, a hexenyl group, an iso-3-hexenyl group, and a cyclohexenyl group.

Examples of the aryl group include a phenyl group, a tolyl group, a xylyl group, and a naphthyl group.

Examples of the aralkyl group include a benzyl group, a 2-phenylethyl group, a 2-naphthylethyl group, and a diphenylmethyl group.

Among them, $R^5$ and $R^6$ are preferably each independently any one of a hydrogen atom, an alkyl group having 1 to 3 carbon atoms, an alkenyl group having 2 or 3 carbon atoms, and an aryl group, more preferably a hydrogen atom or a methyl group, and still more preferably a hydrogen atom. Among them, from the viewpoint of improvement in oxygen absorption performance of the polymer, $R^5$ is preferably a hydrogen atom, $R^6$ is preferably a hydrogen atom or a methyl group, and more preferably both are each a hydrogen atom.

None of $R^3$, $R^4$, $R^5$, and $R^6$ in the general formula (I) are bonded to each other to form a fused-ring structure.

$R^7$ in the general formula (I) represents a hydrogen atom or a methyl group. $R^7$ is preferably a hydrogen atom.

$R^8$ in the general formula (I) represents any one of a hydrogen atom, an alkyl group having 1 to 6 carbon atoms, an alkenyl group having 2 to 6 carbon atoms, an aryl group, and an aralkyl group.

Examples of the alkyl group having 1 to 6 carbon atoms include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, a cyclopropyl group, a cyclobutyl group, a cyclopentyl group, and a cyclohexyl group.

Examples of the alkenyl group having 2 to 6 carbon atoms include a vinyl group, an allyl group, a propenyl group, an isopropenyl group, a butenyl group, an isobutenyl group, pentenyl group, a heptenyl group, a hexenyl group, an iso-3-hexenyl group, and a cyclohexenyl group.

Examples of the aryl group include a phenyl group, a tolyl group, a xylyl group, and a naphthyl group.

Examples of the aralkyl group include a benzyl group, a 2-phenylethyl group, a 2-naphthylethyl group, and a diphenylmethyl group.

Among them, $R^8$ is preferably either a hydrogen atom or an alkenyl group having 2 to 6 carbon atoms, and more preferably a hydrogen atom.

In the general formula (I), n is any integer. From the viewpoint of oxygen absorption performance, n is preferably 2 to 150 and more preferably 2 to 50.

Specific examples of the polymer represented by the general formula (I) include the following polymers, and from the viewpoint of oxygen absorption performance, a polymer represented by the following general formula (II) is preferable.

[Chem. 7]

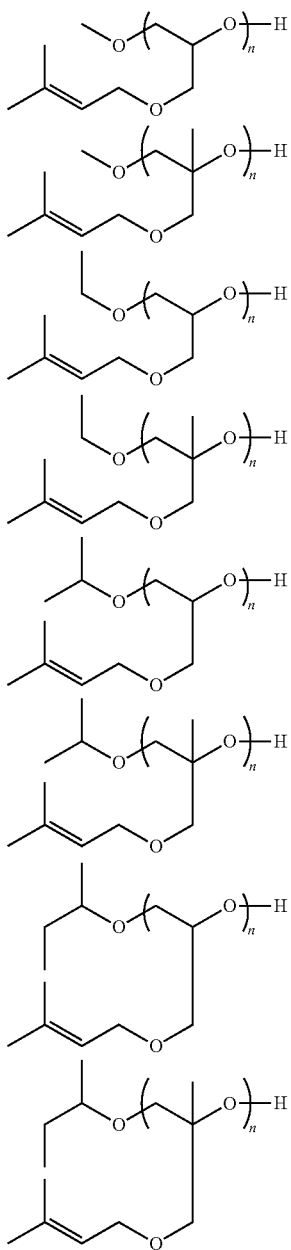

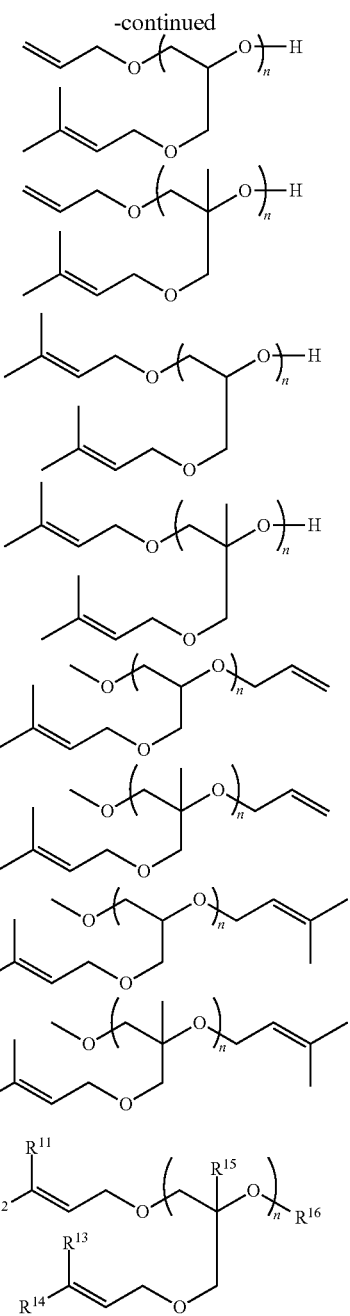

In the general formula (II), $R^{11}$, $R^{12}$, $R^{13}$, and $R^{14}$ each independently represent any one selected from the group consisting of an alkyl group having 1 to 6 carbon atoms, an alkenyl group having 2 to 6 carbon atoms, an aryl group, and an aralkyl group, $R^{15}$ represents a hydrogen atom or a methyl group, $R^{16}$ represents any one selected from the group consisting of a hydrogen atom, an alkyl group having 1 to 6 carbon atoms, an alkenyl group having 2 to 6 carbon atoms, an aryl group, and an aralkyl group. n is any integer.

In the general formula (II), $R^{11}$, $R^{12}$, $R^{13}$, and $R^{14}$ each independently represent any one selected from the group consisting of an alkyl group having 1 to 6 carbon atoms, an alkenyl group having 2 to 6 carbon atoms, an aryl group, and an aralkyl group, and preferred aspects are the same as for $R^3$ and $R^4$ in the general formula (I).

In the general formula (II), $R^{15}$ represents a hydrogen atom or a methyl group, and is preferably a hydrogen atom. $R^{16}$ represents any one selected from the group consisting of a hydrogen atom, an alkyl group having 1 to 6 carbon atoms, an alkenyl group having 2 to 6 carbon atoms, an aryl group, and an aralkyl group, and is preferably a hydrogen atom.

In the general formula (II), n is any integer. From the viewpoint of oxygen absorption performance, n is preferably 2 to 150, and more preferably 2 to 50.

The polymers represented by the general formula (I) and the general formula (II) preferably have a weight average molecular weight (Mw) based on polystyrene standards of 300 to 50,000. The polymer represented by the general formula (I) more preferably has a weight average molecular weight (Mw) based on polystyrene standards of 300 to 1,000, and still more preferably 330 to 500. The polymer represented by the general formula (II) more preferably has a weight average molecular weight (Mw) based on polystyrene standards of 1,000 to 25,000, and still more preferably 3,000 to 10,000.

Note that all the "weight average molecular weights (Mw)" described herein, and all the "number average molecular weights (Mn)" and "molecular weight distributions (Mw/Mn)" as described later are the weight average molecular weights (Mw), number average molecular weights (Mn), and molecular weight distributions (Mw/Mn) based on polystyrene standards determined by a gel permeation chromatography (GPC) measurement, and more specifically are values measured according to a method described in Examples.

The polymer represented by the general formula (I) or the general formula (II) preferably has a molecular weight distribution (Mw/Mn) based on polystyrene standards of 1.05 to 10.00, more preferably 1.05 to 5.00, and still more preferably 1.10 to 3.00.

[Oxygen Absorbent]

The oxygen absorbent of the present invention contains the polymer represented by the general formula (I) or the general formula (II). As described above, the polymer of the present invention is excellent in oxygen absorption performance. Thus, when the oxygen absorbent containing the polymer is used for a coating material, an adhesive, a coating agent, or the like, a curing reaction can be sufficiently promoted.

The oxygen absorbent of the present invention has sufficient oxygen absorption performance because it contains the polymer of the present invention, but may further contain a transition metal salt in order to further improve the oxygen absorption performance.

Examples of the transition metal constituting the transition metal salt include iron, nickel, copper, manganese, cobalt, rhodium, titanium, chromium, vanadium, and ruthenium. Among them, from the viewpoint of improving the oxygen absorption performance of the oxygen absorbent, iron, nickel, copper, manganese, and cobalt are preferable, and cobalt is more preferable.

The counter ion of the transition metal in the transition metal salt is preferably an anion species derived from an organic acid from the viewpoint of compatibility, and examples of the organic acid include acetic acid, stearic acid, dimethyldithiocarbamic acid, palmitic acid, 2-ethylhexanoic acid, neodecanoic acid, linoleic acid, oleic acid, capric acid, and naphthenic acid.

As the transition metal salt to be used in the present invention, any combination of the above transition metal and the above counter ion can be used, but cobalt 2-ethylhexanoate, cobalt neodecanoate, and cobalt stearate are preferable from the viewpoint of the balance between production cost and oxygen absorption performance.

When the oxygen absorbent contains a transition metal salt, the content thereof is preferably 0.001 to 10% by mole, more preferably 0.005 to 5% by mole, still more preferably 0.01 to 1% by mole, and even still more preferably 0.1 to 1% by mole, relative to vinyl group in the polymer.

When the content of the transition metal salt is within the above range, sufficient oxygen absorption performance can be imparted to the oxygen absorbent.

The content of the polymer represented by the general formula (I) or the general formula (II) in the oxygen absorbent of the present invention is not particularly limited, but is preferably 50% by mass or more, more preferably 60% by mass or more, still more preferably 70% by mass or more, still more preferably 80% by mass or more, still more preferably 85% by mass or more, and still more preferably 90% by mass or more, from the viewpoint of effectively absorbing oxygen. In addition, from the viewpoint of the production cost of the oxygen absorbent, it is substantially preferably 100% by mass, more preferably 99.9% by mass or less, and still more preferably 99.8% by mass or less.

The oxygen absorbent of the present invention may contain various additives in addition to the polymer represented by the general formula (I) or the general formula (II) and the transition metal salt as long as the effects of the present invention are not impaired. Specifically the oxygen absorbent may contain a filler, an ultraviolet absorber, a pigment, a thickener, a shrinkage reducing agent, an aging inhibitor, a plasticizer, an aggregate, a flame retardant, a stabilizer, a fiber reinforcement, a dye, an antioxidant, a leveling agent, an anti-sagging agent, and the like.

The oxygen absorbent of the present invention exhibits excellent oxygen absorption performance even at room temperature. Specifically when the oxygen absorbent of the present invention contains no transition metal salt, the oxygen absorption amount at 20° C. is preferably 1.5 mL/g or more, more preferably 2 mL/g or more, and still more preferably 3.5 mL/g or more, as a value at 15 days after the start of use as an oxygen absorbent.

Further, when the oxygen absorbent of the present invention contains no transition metal salt, the oxygen absorption amount at 60° C. is preferably 45 mL/g or more, more preferably 48 mL/g or more, and still more preferably 50 mL/g or more, as a value at 5 days after the start of use as an oxygen absorbent.

The upper limit of the oxygen absorption amount of the oxygen absorbent is not limited, and the oxygen absorption amount can be measured by the method described in Examples.

The oxygen absorbent of the present invention can be obtained by mixing the polymer represented by the general formula (I) or the general formula (II) and, if necessary a transition metal salt and/or various additives. Specifically the oxygen absorbent of the present invention can be obtained, for example, by mixing with stirring the polymer represented by the general formula (I) or the general formula (II) and a transition metal salt.

[Curable Composition]

The curable composition of the present invention contains the oxygen absorbent of the present invention and a polymerizable monomer and/or a polymerizable resin. While the polymer represented by the general formula (I) or the general formula (II) itself has a polymerizable group or a reactive group, the polymer hardly inhibits a crosslinking reaction, a polymerization reaction, or the like when added to a polymerizable monomer and/or resin. Therefore, the curable composition of the present invention is excellent in that it hardly affects a crosslinking reaction or a polymerization reaction of a polymerizable monomer and polymerizable resin even in the presence of oxygen.

The polymerizable monomer used in the curable composition of the present invention is not particularly limited as long as it is a polymerizable monomer used in a coating material, an adhesive, a coating agent, or the like. The polymerizable monomer may be a thermosetting radical polymerizable monomer or may be a polymerizable monomer used for an active energy ray-curable resin, such as a UV-curable resin. The resin is preferably a thermosetting radical polymerizable monomer because the effect of the present invention is more remarkably exhibited depending on the application.

Examples of the radical polymerizable monomer, and the polymerizable monomer used in an active energy ray-curable resin, for use in the present invention, include a monofunctional compound and a polyfunctional compound.

Examples of the monofunctional compound include styrene, vinyl compounds, such as a vinyl ether, a vinyl ester, and N-vinylpyrrolidone, (meth)acryloyl compounds, such as (meth)acrylic acid and a (meth)acrylic acid ester, and allyl compounds, such as allyl alcohol and an allyl ester.

Examples of the polyfunctional compound include a polyvalent (meth)acrylic acid ester having one or more (preferably two or more) (meth)acryloyloxy groups in the molecule and an unsaturated polyester resin. Among them, a polyvalent (meth)acrylic acid ester having one or more (preferably two or more) (meth)acryloyloxy groups in the molecule is preferable, and from the viewpoint of curing rate of the resulting curable composition, coating performance after curing, and the like, a urethane (meth)acrylate and an epoxy (meth)acrylate are particularly preferable. In the curable composition of the present invention, one of the polyfunctional compounds may be contained or two or more thereof may be contained.

Examples of the urethane (meth)acrylate include those obtained by adding a hydroxy group-containing (meth)acrylic acid ester to an isocyanate group-remaining polymer synthesized from a polyhydric alcohol and an excess of a polyvalent isocyanate.

Examples of the polyhydric alcohol include ethylene glycol, 1,2-propanediol, 1,3-propanediol, neopentyl glycol, hydrogenated bisphenol A, and hydrogenated bisphenol F.

Examples of the polyvalent isocyanate include trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, 2,2,4- or 2,4,4-trimethylhexamethylene diisocyanate, lysin diisocyanate, diphenylmethane diisocyanate, and isophorone diisocyanate. Among them, hexamethylene diisocyanate which is excellent in curability is preferable.

As the urethane (meth)acrylate, a urethane (meth)acrylate obtained by reacting hexamethylene diisocyanate as the polyvalent isocyanate and pentaerythritol tri(meth)acrylate as the hydroxy group-containing (meth)acrylic acid ester is preferable.

Examples of the epoxy (meth)acrylate include those obtained by adding (meth)acrylic acid to an epoxy resin, such as those obtained by adding (meth)acrylic acid to a terminal of a bisphenol A-type epoxy resin.

The polymerizable resin used in the curable composition of the present invention is not particularly limited as long as it is a resin used in a coating material, an adhesive, a coating agent, or the like. The resin may be a radical polymerizable resin or an active energy ray-curable resin, such as a UV-curable resin. The resin is preferably a radical polymerizable resin because the effect of the present invention is more remarkably exhibited depending on the application. In addition, because the oxygen absorbent of the present invention is excellent in oxygen absorption performance, the oxygen absorbent can be suitably used for the purpose of allowing an oxygen barrier resin requiring low oxygen permeability to absorb oxygen that has already been contained in the resin.

Specific examples of the resin include radical polymerizable resins, such as an unsaturated polyester resin, a vinyl ester resin, a (meth)acrylic resin having a polymerizable group, and a urethane (meth)acrylate resin; and resins requiring an oxygen barrier property such as a polyvinyl alcohol, an ethylene-vinyl acetate copolymer, a partially or completely saponified ethylene-vinyl acetate copolymer, an epoxy resin, a polyester resin, a polyolefin resin, and a cyclic polyolefin resin.

In addition to the above resins, a fluororesin, a polyamide resin such as polyamide 66, a polycarbonate resin, a polyurethane resin, or the like may be used as necessary.

Examples of the unsaturated polyester resin include a propylene glycol-phthalic anhydride-maleic anhydride copolymer, an ethylene glycol-phthalic anhydride-maleic anhydride copolymer, a copolymer of a polyhydric alcohol compound with an α,β-unsaturated polybasic acid compound and another polybasic acid compound, and those obtained by adding a radical polymerizable monomer, such as styrene, to the above copolymer.

Examples of the polyhydric alcohol compound include ethylene glycol, 1,2-propanediol, 1,3-propanediol, neopentyl glycol, hydrogenated bisphenol A, and hydrogenated bisphenol F.

Examples of the α,β-unsaturated polybasic acid compound include maleic anhydride, maleic acid, fumaric acid, itaconic acid, and citraconic acid. Examples of the other polybasic acid compound include phthalic anhydride, phthalic acid, isophthalic acid, terephthalic acid, tetrahydrophthalic anhydride, Het acid, adipic acid, and sebacic acid. These may be used alone or in combination of two or more.

These copolymers may further contain a glycidyl compound of an unsaturated alcohol, such as allyl glycidyl ether, as one of copolymerization components.

Examples of the vinyl ester resin include those obtained by adding (meth)acrylic acid to an epoxy resin, such as those obtained by adding (meth)acrylic acid to a terminal of a bisphenol A-type epoxy resin.

Examples of the urethane (meth)acrylate resin include those obtained by adding (meth)acrylic acid to an isocyanate group-remaining polymer synthesized from a polyhydric alcohol compound and an excess of a polyvalent isocyanate compound. The polyhydric alcohol compound may be the same as the polyhydric alcohol compound in the description of the unsaturated polyester resin, and examples of the polyvalent isocyanate compound include tolylene diisocyanate, diphenylmethane diisocyanate, isophorone diisocyanate, and hexamethylene diisocyanate.

The content of the polymer represented by the general formula (I) or the general formula (II) in the curable composition of the present invention is preferably 0.1 to 50 parts by mass, more preferably 0.2 to 40 parts by mass, and still more preferably 0.5 to 30 parts by mass, relative to 100 parts by mass of the resin.

The curable composition of the present invention may appropriately contain a pigment, a dye, a filler, an ultraviolet absorber, a thickener, a shrinkage reducing agent, an aging inhibitor, a plasticizer, an aggregate, a flame retardant, a stabilizer, a fiber reinforcement, an antioxidant, a leveling agent, an anti-sagging agent, and the like. In addition, the curable composition of the present invention may contain, for example, styrene, a (meth)acrylic acid ester or the like as a diluent, and it is particularly preferable to contain a (meth)acrylic acid ester from the viewpoint of polymerizable property because the effect of the present invention is more remarkably exhibited.

Examples of the pigment include titanium oxide, red iron oxide, aniline black, carbon black, cyanine blue, and chrome yellow. Examples of the filler include talc, mica, kaolin, calcium carbonate, and clay.

The curable composition of the present invention can be obtained by mixing a polymerizable monomer and/or a polymerizable resin with the oxygen absorbent of the present invention. Specifically the resin composition of the present invention can be obtained by mixing the oxygen absorbent of the present invention, a resin, and optional components as necessary by stirring or the like.

The curable composition of the present invention can be preferably used for, for example, a coating material, an adhesive, an ink, a sealing agent, a resist material, a coating agent, and the like. In particular, the curable composition can be suitably used in curing performed under an environment subject to curing inhibition by oxygen, such as in the air, or in curing in the state where dissolved oxygen remains in the curable composition.

[Method of Producing Polymer Composition Containing the General Formula (V)]

The method of producing a polymer composition containing the general formula (V) of the present invention is a method of producing a polymer composition containing the general formula (V) obtained by reacting a compound represented by the general formula (III), a compound represented by the general formula (IV), and a base.

In the general formula (III), $R^{21}$ and $R^{22}$ each independently represent any one selected from the group consisting of an alkyl group having 1 to 6 carbon atoms, and an alkenyl group having 2 to 6 carbon atoms, an aryl group, and an aralkyl group. Preferred aspects are the same as in $R^3$ and $R^4$ in the general formula (I).

In the general formula (IV), $R^{23}$ represents a hydrogen atom or a methyl group.

In the general formula (V), $R^{21}$, $R^{22}$, and $R^{23}$ have the same meanings as above. $R^{24}$ represents any one selected from the group consisting of a hydrogen atom, an alkyl group having 1 to 6 carbon atoms, an alkenyl group having 2 to 6 carbon atoms, an aryl group, and an aralkyl group, and preferred aspects are the same as in $R^{16}$ in the general formula (I). n is any integer, and preferred aspects are the same as in n in the general formula (I).

In the production method of the present invention, a polymer can be easily produced by reacting a compound represented by the general formula (III) with a compound represented by the general formula (IV) in the presence of a base. Examples of the usable base include inorganic bases, such as an alkali metal oxide, an alkali metal hydroxide, an alkali earth metal oxide, and an alkali earth metal hydroxide, and organic bases, such as triethylamine, diisopropylamine, pyrimidine, diazabicycloundecene, pyridine, triphenylphosphine, and a metal alkoxide. These may be used alone or in combination of two or more, and sodium hydroxide or potassium hydroxide is preferable from the viewpoint of solubility in reactant and activity.

In the production method of the present invention, the ratio of the compound represented by the general formula (III) (hereinafter, also referred to as compound (III)) and the compound represented by the general formula (IV) (hereinafter, also referred to as compound (IV)) is not particularly limited, but from the viewpoint of production of a polymer, the ratio (compound (III)/compound (IV)) is preferably 2/1 to 1/2. With a ratio more than 2/1, a termination reaction proceeds to significantly reduce the amount of the polymer produced, and with a ratio less than 1/2, a side reaction proceeds to significantly reduce the yield.

A specific example of the production method of the present invention is as follows. For example, in production of a polymer represented by the following formula (A-1), a compound that can form a polymerizable moiety such as epichlorohydrin, is reacted with 3-methyl-2-buten-1-ol which is a corresponding alcohol in the presence of alkali, such as potassium hydroxide. As reaction conditions, from the viewpoint of allowing for sufficient reaction, stirring was preferably performed at a temperature of about 60 to 150° C. for about 0.5 to 20 hours. In addition, regarding purification, the reaction liquid after polymerization reaction can be used as it is, or a desired purity can be achieved by a combination of known methods, such as silica gel column, activated carbon column, and distillation operation.

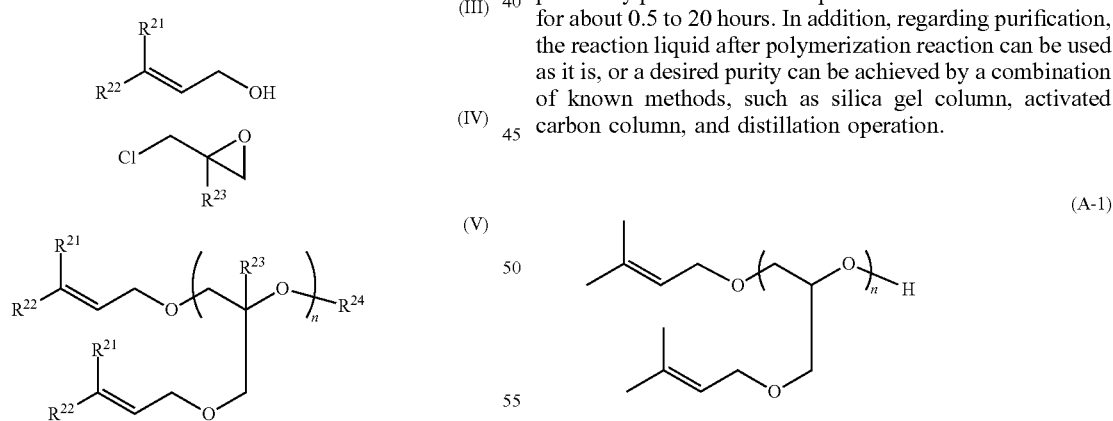

EXAMPLES

The present invention will be described in detail below with reference to examples, but the present invention is not to be limited to the examples. Measurements of physical properties in Examples, Reference Example, and Comparative Example were made by the following methods.

[1H-NMR Measurement Conditions]

To 20 mg of each oxygen absorbent obtained in Examples, Reference Example, and Comparative Example, 4 g of deuterochloroform was added to prepare a homogeneous solution, and the solution was subjected to 1H-NMR measurement under the following measurement conditions.

Apparatus: "ULTRASHIELD 400 PLUS" manufactured by Burker

Standard: tetramethylsilane

Measurement temperature: 25° C.

Cumulative number: 16

[Gel Permeation Chromatography (GPC) Measurement]

To 200 mg of each oxygen absorbent obtained in Examples and Comparative Example, 2 g of tetrahydrofuran (THF) was added to prepare a homogeneous solution. The solution was subjected to gel permeation chromatography analysis under the following measurement conditions to determine the weight average molecular weight (Mw) and number average molecular weight (Mn) based on polystyrene standards, and the molecular weight distribution (Mw/Mn) was calculated.

Apparatus: "HLC-8220 GPC" manufactured by Tosoh Corporation

Column: three columns of "TSKgel Super HM-N (inner diameter: 6 mm, valid length: 15 cm)" manufactured by Tosoh Corporation connected in series Elute: THF at a flow rate of 0.6 mL/minute.

Sample injection: 10 μL

Detector: RI

Detector temperature: 40° C.

[Oxygen Absorption (20° C.) Measurement Method]

100 mg of each oxygen absorbent obtained in Examples or Comparative Example was precisely weighed, and was put into a sample bottle of a 20 mL volume. Then, a small bottle containing 0.5 mL of ion exchange water was placed in the sample bottle for adjusting the humidity in the sample bottle, and the opening of the sample bottle was closed with aluminum seal and a rubber cap sealed with a polytetrafluoroethylene resin.

The sample bottle was allowed to stand in a 20° C. thermostat, and the amounts of the residual oxygen in the sample bottle after lapses of 1 day, 5 days, and 15 days from the start of use as an oxygen absorbent were measured with a residual oxygen meter ("PACK MASTER RO-103" manufactured by IIJIMA Denshi Kogyo K. K.).

As a control, the amount of residual oxygen was measured under the same conditions except for not putting any oxygen absorbent obtained in Examples and Comparative Example, and the difference (oxygen absorption amount) of each measurement value obtained in Examples and Comparative Example from the measurement value obtained for the control was determined. Then, the oxygen absorption amount per gram oxygen absorbent was calculated and was taken as the oxygen absorption amount (20° C.) [mL/g] of the oxygen absorbent. The same test was performed three times and the average was taken.

[Oxygen Absorption Amount (60° C.) Measurement Method]

The oxygen absorption amount (60° C.) [mL/g] of the oxygen absorbent (average of three tests) was measured in the same manner as in measurement of the oxygen absorption amount (20° C.) except for changing the temperature of the thermostat from 20° C. to 60° C.

Example 1

Synthesis of α-(3-methyl-2-butenoxy)-ω-hydroxypoly[oxy(3-methyl-2-butenoxymethyletane-1,2-diyl)] (A-1)

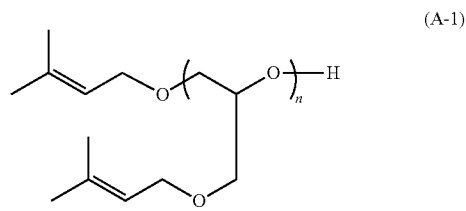

(A-1)

In a reactor equipped with a stirrer, a thermometer, and a dropping funnel, 1654 g (19.2 mol) of 3-methyl-2-buten-1-ol (manufactured by Kuraray Co., Ltd.), 1842 g (23.0 mol) of a 50% aqueous sodium hydroxide solution (manufactured by Kanto Denka Kogyo Co., Ltd.), and 28 g (0.084 mol) of dodecylbenzyldimethyl ammonium chloride (manufactured by Tokyo Chemical Industry Co., Ltd.) were put under nitrogen gas flow. The internal temperature was kept at 60° C. or lower, 1776 g (19.2 mol) of epichlorohydrin (manufactured by FUJI Film Wako Pure Chemical Corporation) was added dropwise with stirring, and after dropwise addition, the temperature was raised to 90° C. After stirring at an internal temperature of 90° C. for 9 hours, the resultant was cooled to 25° C. The reaction liquid was washed with 5000 g of a 7.5% aqueous sodium hydrogen carbonate solution, and then, the upper layer was washed with 5000 mL of ion exchange water. The resulting organic layer was distilled to remove water and unreacted 3-methyl-2-buten-1-ol, thus obtaining 1996 g (yield 73%) of α-(3-methyl-2-butenoxy)-ω-hydroxypoly[oxy(3-methyl-2-butenoxymethyletane-1,2-diyl)] represented by the general formula (A-1). The results of 1H-NMR measurement and GPC measurement are shown below.

1H-NMR (270 MHz, CDCl$_3$, TMS) δ: 5.37-5.32 (m, 5H), 4.02-3.99 (brd, 10H), 3.68-3.56 (m, 4H), 3.55-3.40 (m, 10H), 2.54 (d, J=3.8 Hz, 1H), 1.74 (brs, 15H), 1.66 (brs, H)

GPC Measurement: weight average molecular weight (Mw)=360, number average molecular weight (Mn)=300, molecular weight distribution (Mw/Mn)=1.2 (based on polystyrene standards)

Reference Example 1

Synthesis of 1-(3-methyl-2-butenoxy)-2,3-epoxypropane (A-2)

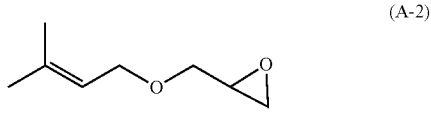

(A-2)

In a reactor equipped with a stirrer, a thermometer, and a dropping funnel, 324 g (3.77 mol) of 3-methyl-2-buten-1-ol (manufactured by Kuraray Co., Ltd.), 2300 mL of cyclohexane, 226 g (5.65 mol) of sodium hydroxide (manufactured by FUJI Film Wako Pure Chemical Corporation, 15.2 g (37.3 mmol) of trioctylmethyl ammonium chloride (manufactured by Tokyo Chemical Industry Co., Ltd., and 226 mL of purified water were put under nitrogen gas flow. The internal temperature was kept at 25° C. or lower, 698 g (7.54 mol) of epichlorohydrin (manufactured by FUJI Film Wako Pure Chemical Corporation) was added dropwise over 90 minutes with stirring, and after dropwise addition, the temperature was raised 40° C. over 30 minutes. Stirring was continued at an internal temperature of 40° C. for 3 hours, and then the resultant was cooled to 25° C. The upper layer of the reaction liquid was washed five times with 670 mL of a saturated saline water, and the organic layer was dried over sodium sulfate. Sodium sulfate was filtered out and the filtrate was concentrated to obtain 536 g of a concentrate. The concentrate was purified by distillation, thus obtaining 242 g (1.67 mol; yield: 44%) of 1-(3-methyl-2-butenoxy)-2,3-epoxypropane represented by the formula (A-2). The result of the 1H-NMR measurement is shown below.

1H-NMR (400 MHz, CDCl$_3$, TMS) δ: 5.35 (tquin, J=6.8, 1.2 Hz, 1H), 4.03 (ddd, J=19.6, 12.0, 7.2 Hz, 2H), 3.68 (dd, J=11.6, 3.2 Hz, 1H), 3.99 (dd, J=11.2, 5.6 Hz, 1H), 3.17-3.13 (m, 1H), 2.79 (dd, J=4.8, 4.0 Hz, 1H), 2.60 (dd, J=5.2, 2.8 Hz, 1H), 1.75 (s, 3H), 1.68 (s, 3H).

Example 2

Synthesis of α-methoxy-ω-hydroxypoly[oxy(3-methyl-2-butenoxymethyletane-1,2-diyl)] (A-3)

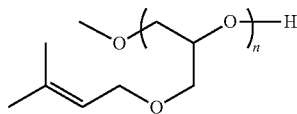

(A-3)

In a reactor equipped with a stirrer, a thermometer, and a dropping funnel, 20 g (0.14 mol) of 3-methyl-2-buten-1-ol (manufactured by Kuraray Co., Ltd.) and 76 mg (1.4 mmol) of sodium methoxide (manufactured by FUJI Film Wako Pure Chemical Corporation) were put under nitrogen gas flow. The internal temperature was raised to 110° C., and the mixture was stirred for 9 hours and was then cooled to 25° C. To the reaction liquid, 1 mL of acetic acid was added, then components of low boiling points were removed through evaporation, thus obtaining 18.8 g (yield: 94%) of α-methoxy-ω-hydroxypoly[oxy(3-methyl-2-butenoxymethyletane-1,2-diyl)] represented by the general formula (A-3). The results of 1H-NMR measurement and GPC measurement are shown below.

1H-NMR (270 MHz, CDCl$_3$, TMS) δ: 5.34 (t, J=13.0 Hz, 47H), 4.05-3.90 (brd, 94H), 3.77-3.35 (m, 235H), 2.61 (brs, 1H), 1.74 (brs, 282H), 1.67 (brs, 282H)

GPC Measurement: weight average molecular weight (Mw)=7600, number average molecular weight (Mn)=4800, molecular weight distribution (Mw/Mn)=1.58 (based on polystyrene standards)

Example 3

In a glass sample bottle, 5.00 g of the compound (A-1) was added and was stirred well, thus obtaining an oxygen absorbent. The evaluation results are shown in Table 1.

Example 4

An oxygen absorbent was obtained in the same manner as in Example 3 except for changing the compound (A-1) in Example 3 to the compound (A-3). The evaluation results are shown in Table 1.

Comparative Example 1

An oxygen absorbent was obtained in the same manner as in Example 3 except for changing the compound (A-1) in Example 1 to 5.00 g (29.0 mmol) of a compound (E-1) represented by the following formula (manufactured by Tokyo Chemical Industry Co., Ltd.; purity: 99%). The evaluation results are shown in Table 1.

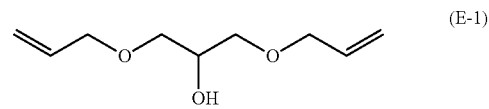

(E-1)

TABLE 1

| | | 1 day | 5 days | 15 days |
|---|---|---|---|---|
| Example 3 | Oxygen absorption amount (20° C.) [mL/g] | 0.4 | 4.1 | 12.7 |
| | Oxygen absorption amount (60° C.) [mL/g] | 17.9 | 48.0 | >49 |
| Example 4 | Oxygen absorption amount (20° C.) [mL/g] | 0.0 | 1.5 | 3.1 |
| | Oxygen absorption amount (60° C.) [mL/g] | 5.9 | >49 | >49 |
| Comparative Example 1 | Oxygen absorption amount (20° C.) [mL/g] | 0.6 | 0.5 | 1.4 |
| | Oxygen absorption amount (60° C.) [mL/g] | 5.8 | 42.5 | >49 |

As shown in Table 1, it can be found that the polymer of the present invention has an excellent oxygen absorption ability even at a normal temperature. Surprisingly, the polymer can absorb oxygen even without a transition metal salt and it is possible to sufficiently allow a curing reaction of a curable composition to occur.

The invention claimed is:
1. A polymer represented by the following general formula (I):

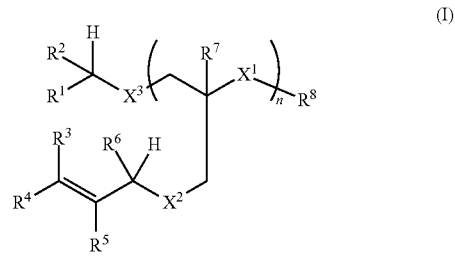

(I)

wherein $X^1$, $X^2$, and $X^3$ each represent a chalcogen atom, $R^1$ and $R^2$ each independently represent any one selected from the group consisting of a hydrogen atom, an alkyl group having 1 to 18 carbon atoms, an alkenyl group having 2 to 18 carbon atoms, and an aralkyl group, $R^3$ and $R^4$ each independently represent any one selected from the group consisting of an alkyl group having 1 to 6 carbon atoms, an alkenyl group having 2 to 6 carbon atoms, an aryl group, and an aralkyl group, $R^5$ and $R^6$ each independently represent any one selected from the group consisting of a hydrogen atom, an alkyl group having 1 to 6 carbon atoms, an alkenyl group having 2 to 6 carbon atoms, an aryl group, and an aralkyl group, $R^7$ represents a hydrogen atom or a methyl group, $R^8$ represents any one selected from the group consisting of a hydrogen atom, an alkyl group having 1 to 6 carbon atoms, an alkenyl group having 2 to 6 carbon atoms, an aryl group, and an aralkyl group, n is any integer, and none of $R^3$, $R^4$, $R^5$, and $R^6$ are bonded to each other to form a ring structure.

2. The polymer according to claim 1, wherein $X^1$ and $X^2$ in the general formula (I) are each an oxygen atom.

3. The polymer according to claim 1, wherein $R^3$ and $R^4$ in the general formula (I) are each an alkyl group having 1 to 6 carbon atoms.

4. The polymer according to claim 1, wherein $R^5$, $R^6$, and $R^7$ in the general formula (I) are each a hydrogen atom.

5. The polymer according to claim 1, wherein $R^8$ in the general formula (I) is a hydrogen atom.

6. A polymer represented by the following general formula (II):

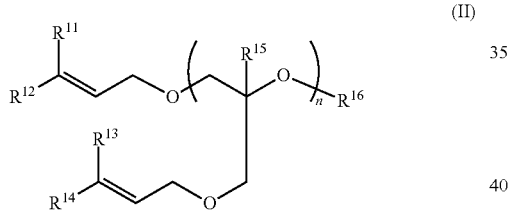

(II)

wherein $R^{11}$, $R^{12}$, $R^{13}$, and $R^{14}$ each independently represent any one selected from the group consisting of an alkyl group having 1 to 6 carbon atoms, an alkenyl group having 2 to 6 carbon atoms, an aryl group, and an aralkyl group, $R^{15}$ represents a hydrogen atom or a methyl group, $R^{16}$ represents any one selected from the group consisting of a hydrogen atom, an alkyl group having 1 to 6 carbon atoms, an alkenyl group having 2 to 6 carbon atoms, an aryl group, and an aralkyl group, and n is any integer.

7. The polymer according to claim 6, wherein $R^{16}$ in the general formula (II) is a hydrogen atom.

8. The polymer according to claim 1, wherein the polymer has a weight average molecular weight (Mw) of 300 to 50,000 and a molecular weight distribution (Mw/Mn) of 1.05 to 10.0, based on polystyrene standards.

9. An oxygen absorbent comprising the polymer according to claim 1.

10. The oxygen absorbent according to claim 9, wherein the oxygen absorbent comprises a transition metal salt in an amount of 0.001 to 10% by mole relative to vinyl group in the polymer.

11. A curable composition comprising the oxygen absorbent according to claim 9 and a polymerizable monomer and/or a polymerizable resin.

12. The curable composition according to claim 11, wherein the polymerizable monomer and/or the polymerizable resin is a radical polymerizable monomer and/or a radical polymerizable resin.

13. A method of producing a polymer composition containing the general formula (V) obtained by reacting a compound represented by the general formula (III), a compound represented by the general formula (IV), and a base:

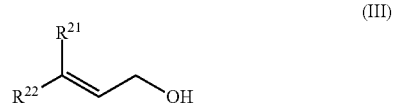

(III)

wherein $R^{21}$ and $R^{22}$ each independently represent any one selected from the group consisting of an alkyl group having 1 to 6 carbon atoms, an alkenyl group having 2 to 6 carbon atoms, an aryl group, and an aralkyl group,

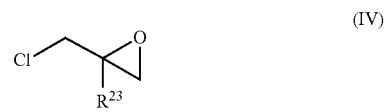

(IV)

wherein $R^{23}$ represents a hydrogen atom or a methyl group,

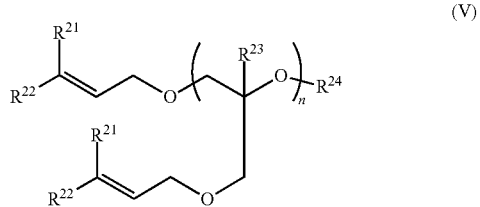

(V)

wherein $R^{21}$, $R^{22}$, and $R^{23}$ have the same meanings as above, $R^{24}$ represents any one selected from the group consisting of a hydrogen atom, an alkyl group having 1 to 6 carbon atoms, an alkenyl group having 2 to 6 carbon atoms, an aryl group, and an aralkyl group, and n is any integer.

14. The method of producing a polymer composition containing the general formula (V) according to claim 13, wherein the compound represented by the general formula (III) and the compound represented by general formula (IV) are used at a ratio (compound (III)/compound (IV)) of 1/2 to 2/1.

15. An oxygen absorbent comprising the polymer according to claim 6.

16. The oxygen absorbent according to claim 15, wherein the oxygen absorbent comprises a transition metal salt in an amount of 0.001 to 10% by mole relative to vinyl group in the polymer.

* * * * *